United States Patent
Zheng et al.

(10) Patent No.: US 12,382,509 B2
(45) Date of Patent: Aug. 5, 2025

(54) TIME DOMAIN RESOURCE CONFIGURATION METHOD AND TERMINAL

(71) Applicant: DATANG MOBILE COMMUNICATIONS EQUIPMENT CO., LTD., Beijing (CN)

(72) Inventors: Shilei Zheng, Beijing (CN); Junwei Wang, Beijing (CN); Rui Zhao, Beijing (CN); Fangchen Cheng, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 345 days.

(21) Appl. No.: 17/921,108

(22) PCT Filed: Apr. 13, 2021

(86) PCT No.: PCT/CN2021/086858
§ 371 (c)(1),
(2) Date: Oct. 24, 2022

(87) PCT Pub. No.: WO2021/227745
PCT Pub. Date: Nov. 18, 2021

(65) Prior Publication Data
US 2023/0171813 A1 Jun. 1, 2023

(30) Foreign Application Priority Data
May 11, 2020 (CN) .......................... 202010393400.9

(51) Int. Cl.
*H04W 74/0833* (2024.01)
*H04L 5/14* (2006.01)
(Continued)

(52) U.S. Cl.
CPC ....... *H04W 74/0841* (2013.01); *H04L 5/1469* (2013.01); *H04L 27/26025* (2021.01); *H04W 74/0866* (2013.01)

(58) Field of Classification Search
CPC ......... H04W 74/0841; H04W 74/0866; H04W 74/0833; H04W 72/0446; H04W 72/23;
(Continued)

(56) References Cited

U.S. PATENT DOCUMENTS

2019/0223223 A1* 7/2019 Ko ........................ H04W 72/23
2019/0306832 A1* 10/2019 Si ......................... H04L 5/0082
(Continued)

FOREIGN PATENT DOCUMENTS

CN 106162921 A 11/2016
CN 110475377 A 11/2019
(Continued)

OTHER PUBLICATIONS

First Japanese Office Action for the corresponding Japanese Patent Application No. 2022-566494 issued by the Japanese Patent Office on Jul. 11, 2023 and its English translation provided by foriegn associate.
(Continued)

*Primary Examiner* — Dady Chery
(74) *Attorney, Agent, or Firm* — Ladas & Parry, LLP

(57) ABSTRACT

The present disclosure provides a time domain resource configuration method and a terminal. The method includes: obtaining configuration information of a physical random access channel (PRACH); where the configuration information includes a first configuration value, and the first configuration value is used to indicate a configuration number of PRACH slots in each target time domain granularity; determining distribution of the PRACH slots in the target time domain granularity according to the configuration informa-
(Continued)

obtaining configuration information of PRACH; where the configuration information includes a first configuration value, and the first configuration value is used to indicate a configuration number of PRACH slots in each target time domain granularity — 11 determining distribution of the PRACH slots in a target time domain granularity according to the configuration information — 12 determining validity of PRACH occasions in the PRACH slots — 13 tion; and determining validity of PRACH occasions in the PRACH slots.

18 Claims, 4 Drawing Sheets

(51) Int. Cl.
*H04L 27/26* (2006.01)
*H04W 74/08* (2009.01)

(58) Field of Classification Search
CPC ............... H04W 72/231; H04L 5/1469; H04L 27/26025; H04L 5/0053
See application file for complete search history.

(56) References Cited

U.S. PATENT DOCUMENTS

| | | | |
|---|---|---|---|
| 2020/0008187 A1 | 1/2020 | Zhang et al. | |
| 2021/0058977 A1 | 2/2021 | Yang et al. | |
| 2021/0076411 A1* | 3/2021 | Ohara | H04W 74/006 |

FOREIGN PATENT DOCUMENTS

| | | | |
|---|---|---|---|
| CN | 111132072 | A | 5/2020 |
| EP | 4228369 | A1 | 8/2023 |
| JP | 2020507279 | A | 3/2020 |
| WO | 2018166048 | A1 | 9/2018 |
| WO | 2019104299 | A1 | 5/2019 |
| WO | 2019138513 | A1 | 7/2019 |
| WO | 2019158984 | A1 | 8/2019 |
| WO | 2019217881 | A2 | 11/2019 |

OTHER PUBLICATIONS

"PRACH Resource Configuration," 3GPP TSG RAN WG1 Meeting #91, R1-1719345, Reno, USA, Nov. 27-Dec. 1, 2017, Source: ZTE, Sanechips, Agenda Item: 7.1.4.1, all pages.
"Channel Structure for Two-Step RACH Consideration," 3GPP TSG RAN WG1 #96, R1-1902133, Athens, Greece, Feb. 25-Mar. 1, 2019, Agenda Item: 7.2.1.1 Channel Structure for Two-Step RACH, Source: Sierra Wireless, all pages.
"Correction to Contention-Based Random Access," 3GPP TSG RAN WG1 #98bis, R1-1910451, Chongqing, China, Oct. 14-20, 2019, Source: Samsung, all pages.
"Text proposals of PUSCH validation rule," 3GPP TSG-RAN WG1 Meeting #100bis-e, R1-2003020, e-meeting, Apr. 20-30, 2020, Agenda Item: 7.2.1, Source: Moderator: ZTE, all pages.
International Search Report for PCT/CN2021/086858 issued on Jun. 2, 2021 and its English Translation provided by WIPO.
Written Opinion for PCT/CN2021/086858 issued on Jun. 2, 2021 and its English Translation provided by WIPO.
International Preliminary Report on Patentability for PCT/CN2021/086858 issued on Nov. 15, 2022 and its English translation provided by WIPO.
The Extended European Search Report for European Patent Application No. 21803831.3 issued by the European Patent Office on Oct. 9, 2023.
"3rd Generation Partnership Project; Technical Specification Group Radio Access Network; NR; Physical layer procedures for control (Release 15)", Technical Specification, 3GPP TS 38.213 V15.9.0 (Mar. 2020).
Second Japanese Office Action for Japanese Patent Application No. 2022-566494 issued by the Japanese Patent Office on Oct. 24, 2023.

\* cited by examiner

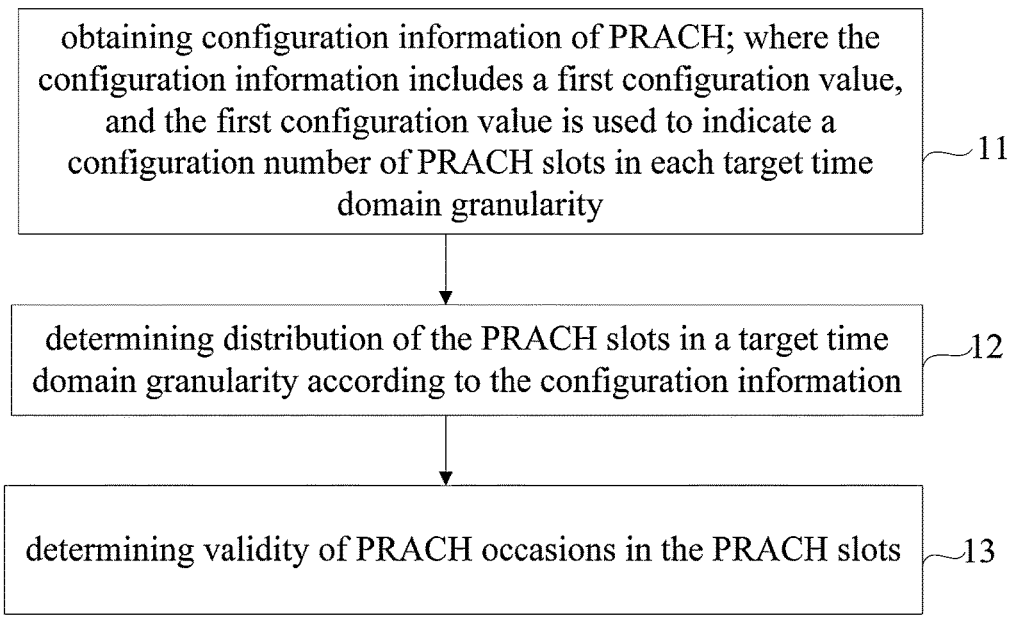
FIG. 1
| PRACH configuration index | preamble format | $n_{SFN} \bmod x = y$ | slot number | starting symbol | number of PRACH slots within a 60 kHz slot | $N_t^{RA,slot}$ number of time-domain PRACH occasions in a PRACH slot | $N_{dur}^{RA}$ time domain symbol duration of PRACH occasion |
|---|---|---|---|---|---|---|---|
| | | | | | | | |
FIG. 2
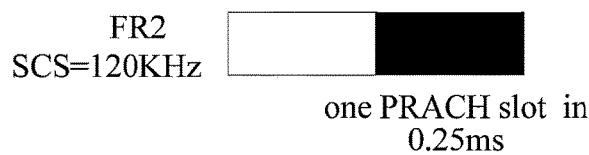
one PRACH slot in 0.25ms
FIG. 3a
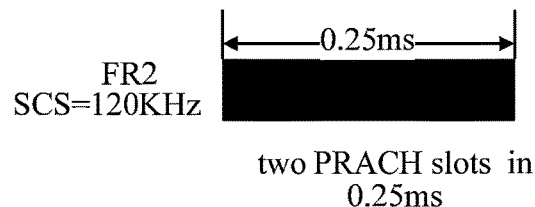
two PRACH slots in 0.25ms
FIG. 3b

| PRACH configuration index | preamble format | $n_{SFN} \bmod x = y$ | slot number | starting symbol | number of PRACH slots within a 240 kHz slot | $N_t^{RA,slot}$ number of time-domain PRACH occasions in a PRACH slot | $N_{dur}^{RA}$ time domain symbol duration of PRACH occasion |
|---|---|---|---|---|---|---|---|
FIG. 4
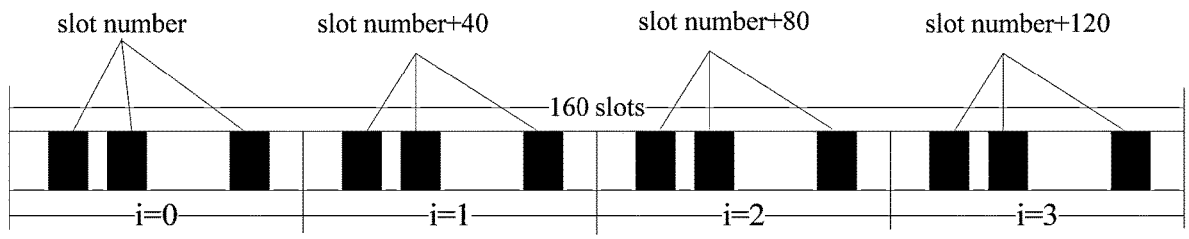
FIG. 5
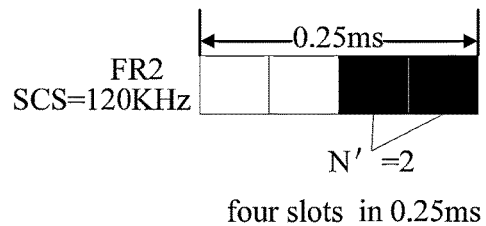
four slots in 0.25ms
FIG. 6
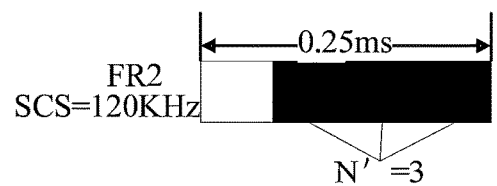
four slots in 0.25ms
FIG. 7

TIME DOMAIN RESOURCE CONFIGURATION METHOD AND TERMINAL

CROSS-REFERENCE TO RELATED APPLICATIONS

This application is the U.S. national phase of PCT Application PCT/CN2021/086858 filed on Apr. 13, 2021, which claims the priority of Chinese Application No. 202010393400.9, filed on May 11, 2020, the disclosures of which are incorporated herein by reference in their entireties.

TECHNICAL FIELD

The present disclosure relates to the field of communication technologies, and in particular to a time domain resource configuration method and a terminal.

BACKGROUND

In a random access time domain resource configuration method in the related art, only one or two physical random access channel (PRACH) slots can be configured in each corresponding duration. For the 52.6 GHz to 71 GHz spectrum of the new radio (NR), compared with a high frequency band 2 (FR2, i.e., 24.25 GHz to 52.6 GHz) in related art, additional new parameters such as subcarrier spacing (SCS) may be introduced, and the number of configurable PRACH slots is no longer limited to 1 or 2, but the mechanism in the related art cannot support configuration of more PRACH slots, which will lead to longer time required for transmission at the same number of PRACH occasions, thereby increasing transmission delay of PRACH resources and reducing flexibility of scheduling of the PRACH resources.

SUMMARY

The present disclosure provides an a time domain resource configuration method and a terminal, which can solve the problems of transmission delay of PRACH occasions caused by the random access time domain resource configuration mechanism in the related art when PRACH with larger SCS is introduced.

One embodiment of the present disclosure provides a time domain resource configuration method, including:
obtaining configuration information of a physical random access channel (PRACH); wherein the configuration information includes a first configuration value, and the first configuration value is used to indicate a configuration number of PRACH slots in each target time domain granularity;
determining distribution of the PRACH slots in the target time domain granularity according to the configuration information; and
determining validity of PRACH occasions in the PRACH slots.

Optionally, in case that the target time domain granularity is a first time domain granularity, the first configuration value is a configuration number of PRACH slots in each first time domain granularity, which is expressed with the following formula:

$$N'=N=3, \ldots 2^\mu \times 15/60;$$

wherein N' represents the configuration number of the PRACH slots in each first time domain granularity, N represents the first configuration value, and μ is a high-level parameter which is used to indicate a subcarrier spacing (SCS), μ≥4.

Optionally, in case that the target time domain granularity is a first time domain granularity, the first configuration value indicates a configuration number of PRACH slots in each first time domain granularity with a formula:

$$N' = N \times \frac{2^\mu \times 15}{60}/2;$$

wherein N' represents the configuration number of PRACH slots in each first time domain granularity, N represents the first configuration value, μ is a high-level parameter which is used to indicate a subcarrier spacing (SCS), μ≥4.

Optionally, in case that the target time domain granularity is a first time domain granularity, a configuration number of PRACH slots in each first time domain granularity, which is corresponding to the first configuration value, is configured by radio resource control (RRC) or indicated by pre-configuration;
a value range of the configuration number N' of PRACH slots in each first time domain granularity is: [1 to $2^\mu \times 15/60$], μ is a high-level parameter which is used to indicate a subcarrier spacing (SCS), μ≥4.

Optionally, the first time domain granularity is a time domain duration of a slot corresponding to a subcarrier spacing (SCS) of 60 KHz.

Optionally, the first configuration value indicates a configuration number of PRACH slots in each second time domain granularity, and the second time domain granularity is a time domain duration of a slot corresponding to a subcarrier spacing (SCS) of 240 KHz.

Optionally, elements in a second time domain granularity index set in one frame period are: an element in a first time domain granularity index set+40*i; wherein i=0, 1, 2, 3, and the first time domain granularity is a time domain duration of a slot corresponding to a subcarrier spacing (SCS) of 60 KHz.

Optionally, the determining distribution of the PRACH slots in the target time domain granularity according to the configuration information, includes: in the target time domain granularity, selecting N' consecutive slots from back to front in time sequence as the PRACH slots; wherein N' is the configuration number of PRACH slots in each target time domain granularity.

Optionally, the determining distribution of the PRACH slots in the target time domain granularity according to the configuration information, includes:
judging validity of each slot in the target time domain granularity according to preset conditions and filtering out valid slots; and
determining the distribution of the PRACH slots in the target time domain granularity according to the configuration number of the PRACH slots in each target time domain granularity and the number of the valid slots.

Optionally, after judging validity of each slot in the target time domain granularity according to preset conditions, the method further includes: sending a judgment result of the validity of each slot to a network device.

Optionally, the judging validity of each slot in the target time domain granularity according to preset conditions and filtering out valid slots, includes one of the following:

in case that a communication mode is time division duplex (TDD) mode and the terminal does not receive TDD uplink-downlink configuration, if a slot includes a synchronization signal block (SSB) and the number of remaining symbols after an end symbol of a last SSB in the slot is less than a first value, judging that the slot is an invalid slot;

in case that a communication mode is time division duplex (TDD) mode and the terminal receives TDD uplink-downlink configuration, if the number of consecutive uplink symbols in a slot is less than a first value, judging that the slot is an invalid slot;

wherein the first value is $N_{dur}^{RA}+N_{gap}$, $N_{dur}^{RA}$ represents the number of time domain symbols in each PRACH occasion in the configuration information of PRACH, and $N_{gap}$ is a value related to the subcarrier spacing (SCS).

Optionally, the determining the distribution of the PRACH slots in the target time domain granularity according to the configuration number of the PRACH slots in each target time domain granularity and the number of the valid slots, includes:

in case that a number M of valid slots is greater than or equal to the configuration number N' of the PRACH slots in each target time domain granularity, determining the distribution of the PRACH slots according to one of the following manners:

from the M valid slots, selecting the first N' slots in time sequence as the PRACH slots;

from the M valid slots, selecting the last N' slots in time sequence as the PRACH slots;

from the M valid slots, selecting, in a comb-like manner, N' slots as the PRACH slots.

Optionally, the determining the distribution of the PRACH slots in the target time domain granularity according to the configuration number of the PRACH slots in each target time domain granularity and the number of the valid slots, includes:

in case that a number M of valid slots is less than the configuration number N' of the PRACH slots in each target time domain granularity, taking the M valid slots as the PRACH slots.

Optionally, the determining distribution of the PRACH slots in the target time domain granularity according to the configuration information, includes:

segmenting the target time domain granularity according to the configuration information;

determining distribution of PRACH slots in each segment of the target time domain granularity, according to the configuration number of PRACH slots;

wherein N' consecutive slots are selected, in time sequence from back to front, from each segment of the target time domain granularity, as PRACH slots, and N' is the configuration number of the PRACH slots in each target time domain granularity.

Optionally, the segmenting the target time domain granularity according to the configuration information, includes:

equally dividing the target time domain granularity into L segments by the formula:

$$L = \frac{2^{\mu-1} \times 15}{60};$$

wherein L represents the number of segments for segmenting the target time domain granularity, and μ is a high-level parameter which is used to indicate the subcarrier interval (SCS), μ≥4.

Optionally, the determining validity of PRACH occasions in the PRACH slots, includes:

in case that a communication mode is frequency division duplex (FDD) mode, determining that PRACH occasions are valid;

in case that the communication mode is time division duplex (TDD) mode and the terminal does not receive TDD UL-DL configuration, in the PRACH slot, if there is no synchronization signal block (SSB) behind an PRACH occasion and there are at least $N_{gap}$ symbols between the PRACH occasion and a last symbol of a preceding nearest SSB, determining that the PRACH occasion is valid;

in case that the communication mode is time division duplex (TDD) mode and the terminal receives TDD UL-DL configuration, if an PRACH occasion is on an uplink (UL) symbol, and in the PRACH slot, if there is no synchronization signal block (SSB) behind the PRACH occasion and there are at least $N_{gap}$ symbols between the PRACH occasion and a last symbol of a preceding nearest SSB, and there are at least $N_{gap}$ symbols between the PRACH occasion and a last preceding downlink (DL) symbol, determining that the PRACH occasion is valid; wherein $N_{gap}$ is a value related to the subcarrier spacing (SCS).

One embodiment of the present disclosure provides a terminal, including: a transceiver, a memory, a processor, and a computer program stored on the memory and executable on the processor; wherein the processor executes the computer program to implement the following steps:

obtaining configuration information of a physical random access channel (PRACH); wherein the configuration information includes a first configuration value, and the first configuration value is used to indicate a configuration number of PRACH slots in each target time domain granularity;

determining distribution of the PRACH slots in the target time domain granularity according to the configuration information; and determining validity of PRACH occasions in the PRACH slots.

Optionally, in case that the target time domain granularity is a first time domain granularity, the first configuration value is a configuration number of PRACH slots in each first time domain granularity, which is expressed with the following formula:

$$N'=N=3, \ldots 2^{\mu} \times 15/60;$$

wherein N' represents the configuration number of the PRACH slots in each first time domain granularity, N represents the first configuration value, and μ is a high-level parameter which is used to indicate a subcarrier spacing (SCS), μ≥4.

Optionally, in case that the target time domain granularity is a first time domain granularity, the first configuration value indicates a configuration number of PRACH slots in each first time domain granularity with a formula:

$$N' = N \times \frac{2^{\mu} \times 15}{60}/2;$$

wherein N' represents the configuration number of PRACH slots in each first time domain granularity, N represents the first configuration value, µ is a high-level parameter which is used to indicate a subcarrier spacing (SCS), µ≥4.

Optionally, in case that the target time domain granularity is a first time domain granularity, a configuration number of PRACH slots in each first time domain granularity, which is corresponding to the first configuration value, is configured by radio resource control (RRC) or indicated by pre-configuration;

a value range of the configuration number N' of PRACH slots in each first time domain granularity is: [1 to $2^\mu \times 15/60$], µ is a high-level parameter which is used to indicate a subcarrier spacing (SCS), µ≥4.

Optionally, the first time domain granularity is a time domain duration of a slot corresponding to a subcarrier spacing (SCS) of 60 KHz.

Optionally, the first configuration value indicates a configuration number of PRACH slots in each second time domain granularity, and the second time domain granularity is a time domain duration of a slot corresponding to a subcarrier spacing (SCS) of 240 KHz.

Optionally, elements in a second time domain granularity index set in one frame period are: an element in a first time domain granularity index set+40*i; wherein i=0, 1, 2, 3, and the first time domain granularity is a time domain duration of a slot corresponding to a subcarrier spacing (SCS) of 60 KHz.

Optionally, the processor executes the computer program to implement the following steps:
in the target time domain granularity, selecting N' consecutive slots from back to front in time sequence as the PRACH slots; wherein N' is the configuration number of PRACH slots in each target time domain granularity.

Optionally, the processor executes the computer program to implement the following steps:
judging validity of each slot in the target time domain granularity according to preset conditions and filtering out valid slots; and
determining the distribution of the PRACH slots in the target time domain granularity according to the configuration number of the PRACH slots in each target time domain granularity and the number of the valid slots.

Optionally, the processor executes the computer program to implement the following steps: sending a judgment result of the validity of each slot to a network device.

Optionally, the processor executes the computer program to implement one of the following steps:
in case that a communication mode is time division duplex (TDD) mode and the terminal does not receive TDD uplink-downlink configuration, if a slot includes a synchronization signal block (SSB) and the number of remaining symbols after an end symbol of a last SSB in the slot is less than a first value, judging that the slot is an invalid slot;
in case that a communication mode is time division duplex (TDD) mode and the terminal receives TDD uplink-downlink configuration, if the number of consecutive uplink symbols in a slot is less than a first value, judging that the slot is an invalid slot;
wherein the first value is $N_{dur}^{RA}+N_{gap}$, $N_{dur}^{RA}$ represents the number of time domain symbols in each PRACH occasion in the configuration information of PRACH, and $N_{gap}$ is a value related to the subcarrier spacing (SCS).

Optionally, the processor executes the computer program to implement the following steps:
in case that a number M of valid slots is greater than or equal to the configuration number N' of the PRACH slots in each target time domain granularity, determining the distribution of the PRACH slots according to one of the following manners:
from the M valid slots, selecting the first N' slots in time sequence as the PRACH slots;
from the M valid slots, selecting the last N' slots in time sequence as the PRACH slots;
from the M valid slots, selecting, in a comb-like manner, N' slots as the PRACH slots.

Optionally, the processor executes the computer program to implement the following steps: in case that a number M of valid slots is less than the configuration number N' of the PRACH slots in each target time domain granularity, taking the M valid slots as the PRACH slots.

Optionally, the processor executes the computer program to implement the following steps:
segmenting the target time domain granularity according to the configuration information;
determining distribution of PRACH slots in each segment of the target time domain granularity, according to the configuration number of PRACH slots;
wherein N' consecutive slots are selected, in time sequence from back to front, from each segment of the target time domain granularity, as PRACH slots, and N' is the configuration number of the PRACH slots in each target time domain granularity.

Optionally, the processor executes the computer program to implement the following steps:
equally dividing the target time domain granularity into L segments by the formula:

$$L = \frac{2^\mu \times 15}{60};$$

wherein L represents the number of segments for segmenting the target time domain granularity, and µ is a high-level parameter which is used to indicate the subcarrier interval (SCS), µ≥4.

Optionally, the processor executes the computer program to implement the following steps:
in case that a communication mode is frequency division duplex (FDD) mode, determining that PRACH occasions are valid;
in case that the communication mode is time division duplex (TDD) mode and the terminal does not receive TDD UL-DL configuration, in the PRACH slot, if there is no synchronization signal block (SSB) behind an PRACH occasion and there are at least $N_{gap}$ symbols between the PRACH occasion and a last symbol of a preceding nearest SSB, determining that the PRACH occasion is valid;
in case that the communication mode is time division duplex (TDD) mode and the terminal receives TDD UL-DL configuration, if an PRACH occasion is on an uplink (UL) symbol, and in the PRACH slot, if there is no synchronization signal block (SSB) behind the PRACH occasion and there are at least $N_{gap}$ symbols between the PRACH occasion and a last symbol of a preceding nearest SSB, and there are at least $N_{gap}$ symbols between the PRACH occasion and a last preceding downlink (DL) symbol, determining that the PRACH occasion is valid; wherein $N_{gap}$ is a value related to the subcarrier spacing (SCS).

One embodiment of the present disclosure provides a terminal, including:

an obtaining module configured to obtain configuration information of a physical random access channel (PRACH); wherein the configuration information includes a first configuration value, and the first configuration value is used to indicate a configuration number of PRACH slots in each target time domain granularity;

a first determining module configured to determine distribution of the PRACH slots in the target time domain granularity according to the configuration information; and a second determining module configured to determine validity of PRACH occasions in the PRACH slots.

One embodiment of the present disclosure provides a computer-readable storage medium, including: a computer program stored thereon; wherein the computer program is executed by a processor to implement the steps of the above time domain resource configuration method.

The beneficial effects of the above technical solutions of the present disclosure are as follows. For the situation that larger subcarrier spacing and other parameters may be introduced for the frequency band above NR 52.6 GHz, by using the first configuration value in the configuration information to indicate the configuration number of PRACH slots in each target time domain granularity, determining distribution of the PRACH slots in the target time domain granularity according to the configuration information and determining validity of PRACH occasions in the PRACH slot, it can provide a more reliable PRACH resource selection mechanism for PRACH for which a larger SCS may be introduced in the future.

BRIEF DESCRIPTION OF THE DRAWINGS

FIG. 1 is a schematic flowchart of a time domain resource configuration method according to an embodiment of the present disclosure;

FIG. 2 is a first schematic diagram of PRACH configuration index according to an embodiment of the present disclosure;

FIG. 3a is a first schematic diagram showing distribution of an PRACH slot in a target time domain granularity;

FIG. 3b is a second schematic diagram showing distribution of PRACH slots in a target time domain granularity;

FIG. 4 is a second schematic diagram of PRACH configuration index according to an embodiment of the present disclosure;

FIG. 5 is a schematic diagram of slot numbers according to an embodiment of the present disclosure;

FIG. 6 is a third schematic diagram showing distribution of PRACH slots in a target time domain granularity;

FIG. 7 is a fourth schematic diagram showing distribution of PRACH slots in a target time domain granularity;

DETAILED DESCRIPTION

Figure 8:
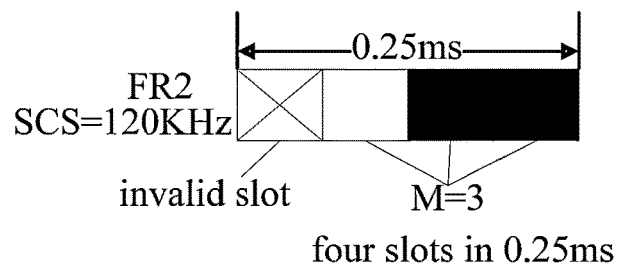
FIG. 8 is a fifth schematic diagram showing distribution of PRACH slots in a target time domain granularity.

In order to make technical problems, technical solutions and advantages of the present disclosure more clear, detailed description will be described hereinafter in conjunction with accompanying drawings and embodiments. In the following description, specific details such as specific configurations and components are provided only to assist in a comprehensive understanding of the embodiments of the present disclosure. It will be apparent to those skilled in the art that various changes and modifications may be made to the embodiments described herein without departing from the scope and spirit of the present disclosure. In addition, descriptions of well-known functions and constructions are omitted for clarity and conciseness.

It should be understood that, "an embodiment" or "one embodiment" mentioned throughout the specification means as follows. A specific feature, structure or characteristic related with the embodiment is included by at least one embodiment of the present disclosure. Thus, "in an embodiment" or "one embodiment" throughout the whole specification does not necessarily refer to the same embodiment. In addition, these specific features, structures or characteristics may be combined into one or more embodiments in any appropriate manner.

In various embodiments of the present disclosure, it should be understood that, number sequence of each following process does not mean order of execution. The order of execution of each process should be determined by function and internal logic thereof, instead of making any limitation to implementation process of embodiments in the present disclosure.

In addition, terms "system" and "network" in the present disclosure may be exchanged for use.

In the embodiments provided by the present disclosure, it should be understood that, "B corresponds to A" refers to as follows. B is related with A, and B may be determined based on A. It should also be understood that, determining B based on A does not mean to determine B only based on A, B may be determined based on A and/or other information.

In the embodiments of the present disclosure, the form of accessing network is not limited, and may include accessing network through a macro base station, a pico base station, an Node B (which is the name of a third generation (3G) mobile base station), an enhanced node base station (eNB), a home enhanced base station (femto eNB, or home eNode B, or home eNB, or HeNB), a relay station, an access point, a remote radio unit (RRU), a remote radio head (RRH). A user terminal may be a mobile phone (or cell phone), or other devices capable of sending or receiving wireless signals, including a user equipment, a personal digital assistant (PDA), a wireless modem, a wireless communication device, a handheld device, a laptop computer, a cordless phone, a wireless local loop (WLL) station, a customer premise equipment (CPE) or a mobile smart hotspot or a smart home appliance which can convert mobile signals to wireless fidelity (WiFi) signals, or other devices that can spontaneously communicate with the mobile communication network without human operation.

As shown in FIG. 1, one embodiment of the present disclosure provides a time domain resource configuration method, which can configure PRACH time domain resources in frequency bands above 52.6 GHz. The method includes the following steps.

Step 11: obtaining configuration information of a physical random access channel (PRACH); where the configuration information includes a first configuration value, and the first configuration value is used to indicate a configuration number of PRACH slots in each target time domain granularity.

The configuration information may be a PRACH configuration index in tabular form configured for cells. As shown in FIG. 2, the configuration information may include: a preamble format, a radio frame where a PRACH resource is located, a slot number, a starting symbol of a PRACH resource in a random access channel (RACH) slot, the number of time-domain PRACH occasions within a PRACH slot, time domain symbol length of PRACH occasion (PRACH duration), and the number of PRACH slots within a time-domain granularity (such as the number of PRACH slots within a 60 kHz slot).

In this embodiment, the configuration information includes the first configuration value, and the first configuration value is used to indicate the configuration number of the PRACH slots in each target time domain granularity. The target time domain granularity may be a first time domain granularity or a second time domain granularity. The first time domain granularity is a time domain duration of a slot corresponding to a subcarrier spacing (SCS) of 60 KHz, and the second time domain granularity is a time domain duration of a slot corresponding to a subcarrier spacing (SCS) of 240 KHz. When the first configuration value indicates the configuration number of the PRACH slots in each target time domain granularity, the configuration number may be directly represented by the first configuration value, or the configuration number may be indicated by pre-configured rules or rules defined by high-level parameters. It should be noted that the configuration number of the PRACH slots in each target time domain granularity may be greater than 2; for example, the configuration number of PRACH slots in each target time domain granularity is 3 or 4.

Step 12: determining distribution of the PRACH slots in the target time domain granularity according to the configuration information.

The target time domain granularity includes multiple slots, and locations of the PRACH slots in the multiple slots can be determined according to the configuration information. By taking high-frequency FR2 as an example, under FR2, PRACH SCS supports 60 KHz or 120 KHz; in a time domain granularity (i.e., 0.25 ms), when SCS=120 KHz, there may be one or two PRACH slots within one time domain granularity. As shown in FIG. 3a, within one target time domain granularity in which two slots are allowed to be configured, the first configuration value indicates that a configuration number of PRACH slots in such target time domain granularity is one, and then a second slot in the target time domain granularity may be selected as a PRACH slot. As shown in FIG. 3b, if the first configuration value indicates that a configuration number of PRACH slots in such target time domain granularity is two, then both of two slots in the target time domain granularity are PRACH slots.

It should be noted that when determining distribution of the PRACH slots in the target time domain granularity, the first N' slots in timing sequence may be selected as PRACH slots, or the last N' slots in timing sequence may be selected as PRACH slots; such selection may also be performed in other ways, and specific determination rules can be set according to requirements.

Step 13: determining validity of PRACH occasions in the PRACH slots.

After determining the distribution of the PRACH slots in the target time domain granularity and obtaining corresponding PRACH resource configuration, whether configured PRACH occasions are valid or not needs to be judged based on a specific frame structure, that is, resources configured in actual process need to be selected according to changes of actual frame structures, thereby finally obtaining valid PRACH occasions.

In the embodiments of the present disclosure, for the situation that larger subcarrier spacing and other parameters may be introduced for the frequency band above NR 52.6 GHz, by using the first configuration value in the configuration information to indicate the configuration number of PRACH slots in each target time domain granularity, determining distribution of the PRACH slots in the target time domain granularity according to the configuration information and determining validity of PRACH occasions in the PRACH slot, it can provide a more reliable PRACH resource selection mechanism for PRACH for which a larger SCS may be introduced in the future.

Specifically, after the terminal receives the configuration information PRACH-ConfigurationIndex of the cell, the terminal determines a PRACH slot that needs to be configured within a current time domain granularity. When the first configuration value indicates the configuration number of the PRACH slots in each target time domain granularity, the configuration number may be directly represented by the first configuration value, or the configuration number may be indicated by pre-configured rules or rules defined by high-level parameters. Manners in which the first configuration value indicates the configuration number of the PRACH slot in each target time domain granularity, are described hereinafter with specific embodiments.

First manner: in case that the target time domain granularity is the first time domain granularity, the first configuration value is a configuration number of PRACH slots in each first time domain granularity; that is, $$N'=N=3, \ldots 2^\mu \times 15/60;$$

Where N' represents the configuration number of the PRACH slots in each first time domain granularity, N represents the first configuration value, and $\mu$ is a high-level parameter which is used to indicate a subcarrier spacing (SCS), $\mu \geq 4$.

In this embodiment, the first time domain granularity is a time domain duration of a slot corresponding to a subcarrier spacing (SCS) of 60 KHz, that is, the configuration number of PRACH slots in each first time domain granularity is the number of PRACH slots within a 60 KHz slot. The first configuration value N=3, . . . $2^\mu \times 15/60$, $\mu$ is a high-level parameter, $\mu \geq 4$, and it can be seen from the above formula that the first configuration value in this embodiment is greater than 2, that is, the configuration number of PRACH slots in each first time domain granularity is greater than 2, which expands configurable number of PRACH slots, thereby ensuring that transmission delay of the PRACH resources can be avoided when a larger PRACH SCS is introduced. For other configuration parameters other than the first configuration value, reference may be made to parameters in a random access configuration table in the related art.

Second manner: in case that the target time domain granularity is the first time domain granularity, the first configuration value indicates a configuration number of PRACH slots in each first time domain granularity with a formula:

$$N' = N \times \frac{2^\mu \times 15}{60}/2;$$

Where N' represents the configuration number of PRACH slots in each first time domain granularity, N represents the first configuration value, μ is a high-level parameter which is used to indicate a subcarrier spacing (SCS), μ≥4.

In this embodiment, the first time domain granularity is a time domain duration of a slot corresponding to a subcarrier spacing (SCS) of 60 KHz, that is, the configuration number of PRACH slots in each first time domain granularity is the number of PRACH slots within a 60 KHz slot. The second manner defines actual meaning represented by the first configuration value in a pre-configured manner. According to the formula of the second manner, an actually configured configuration number of PRACH slots in each first time domain granularity can be obtained. For other configuration parameters other than the first configuration value, reference may be made to parameters in a random access configuration table in the related art.

Since the PRACH configuration information in the present disclosure is mainly for frequency bands above 52.6 GHz, herein should be greater than or equal to 2. It is supposed that when μ=4, it means that SCS=240 KHz at this point; if the first configuration value in the current configuration information is N=1 then the actually configured number of PRACH slots is $$N' = 1 \times \frac{2^4 \times 15}{60}/2 = 2.$$

If the first configuration value in the current configuration information is N=2, then, similarly, it can be concluded that the actually configured number of PRACH slots is N'=4.

It can be seen from μ≥4 that the actually configured number of PRACH slots N'≥2, which expands configurable number of PRACH slots, thereby ensuring that transmission delay of the PRACH resources can be avoided when a larger PRACH SCS is introduced.

Third manner: in case that the target time domain granularity is the first time domain granularity, the configuration number of PRACH slots in each first time domain granularity, which is corresponding to the first configuration value, is configured by Radio Resource Control (RRC) or indicated by pre-configuration.

A value range of the configuration number N' of PRACH slots in each first time domain granularity is: [1 to $2^\mu \times 15/60$], μ is a high-level parameter which is used to indicate a subcarrier spacing (SCS), μ≥4.

In this embodiment, the first time domain granularity is a time domain duration of a slot corresponding to a subcarrier spacing (SCS) of 60 KHz, that is, the configuration number of PRACH slots in each first time domain granularity is the number of PRACH slots within a 60 KHz slot. The actual meaning represented by the first configuration value is defined through RRC configuration or pre-configuration. For example, when the first configuration value N=1, the actually configured number N' of PRACH slots is "a"; when the first configuration value N=2, the actually configured number N' of PRACH slots is "b", where values of "a" and "b" depend on RRC configuration or pre-configuration.

Assuming that an upper layer configures a=3 and b=4 according to actual situations, it means that N=1 in the configuration information indicates that the actually configured number of PRACH slots is a=3, and N=2 in the configuration information indicates that the actually configured number of PRACH slots is b=4.

Since the value range of the configuration number N' of PRACH slots is: [1 to $2^\mu \times 15/60$], μ≥4, it can be seen that the value range of the configuration number of PRACH slots is 1 to 4, which expands configurable number of PRACH slots, thereby ensuring that transmission delay of the PRACH resources can be avoided when a larger PRACH SCS is introduced. For other configuration parameters other than the first configuration value, reference may be made to parameters in a random access configuration table in the related art.

Fourth manner: the first configuration value indicates a configuration number of PRACH slots in each second time domain granularity, and the second time domain granularity is a time domain duration of a slot corresponding to a subcarrier spacing (SCS) of 240 KHz.

In this embodiment, the time domain granularity in the configuration information is modified from 60 KHz as a reference to 240 KHz as a reference, that is, the configuration number of PRACH slots in each second time domain granularity is the number of PRACH slots within a 240 KHz slot. Therefore, a time domain granularity index set in one frame period should be correspondingly expanded to 4 times an original size, that is, elements in a second time domain granularity index set in one frame period are: elements in a first time domain granularity index set+40*i; where i=0, 1, 2, 3, and the first time domain granularity is a time domain duration of a slot corresponding to a subcarrier spacing (SCS) of 60 KHz. As shown in FIG. 4, the sixth column in FIG. 4 is modified from "number of PRACH slots within a 60 KHz slot" to "number of PRACH slots within a 240 KHz slot", and a value corresponding to a corresponding "slot number" is also expanded to four times an original value.

At this point, since the time domain granularity is modified from 60 KHz as a reference to 240 KHz as a reference, in the same 10 ms period, original 40 slots should be expanded by four times to a total of 160 slots. A new [slot number] set is modified to [slot number]+40*i, where i=0, 1, 2, 3, and remaining parameters in the configuration information remain unchanged, as shown in FIG. 5. This expands configurable number of PRACH slots, thereby ensuring that transmission delay of the PRACH resources can be avoided when a larger PRACH SCS is introduced.

Specifically, after the configuration information of the PRACH is obtained and the first configuration value in the configuration information indicates the configuration number of PRACH slots in each target time domain granularity in any one of the above manners, the determining distribution of the PRACH slots in the target time domain granularity according to the configuration information in the step 12 includes:

Step 121: in the target time domain granularity, selecting N' consecutive slots from back to front in time sequence as the PRACH slots; where N' is the configuration number of PRACH slots in each target time domain granularity.

In this embodiment, one specific determination rule for determining the specific locations of the PRACH slots according to the specific configuration information of the PRACH in the step 11, may include: in each configured time domain granularity, selecting N' consecutive slots from back to front in time sequence as the PRACH slots. Selecting the last N' slots in each time domain granularity as the PRACH slots can improve validity of PRACH occasions and the PRACH slots. It should be noted that other rules may also be used to select PRACH slots according to requirements, for example, the first N' slots in the time sequence may be selected as PRACH slots.

Optionally, after obtaining the locations of the corresponding PRACH slots, whether PRACH occasions configured in the PRACH slots are valid or not needs to be judged based on a specific frame structure; that is, resources configured in actual process need to be selected according to changes of actual frame structures, and corresponding judgment conditions are as follows:

A: in case that the communication mode is frequency division duplex (FDD) mode, PRACH occasions are valid; that is, all PRACH occasions in this mode are valid.

B: in case that the communication mode is time division duplex (TDD) mode and the terminal does not receive TDD UL-DL configuration (TDD UL-DL-ConfigurationCommon), in the PRACH slot, if there is no synchronization signal block (SSB) behind an PRACH occasion and there are at least $N_{gap}$ symbols between the PRACH occasion and a last symbol of a preceding nearest SSB, then the PRACH occasion is valid; where $N_{gap}$ is a value related to the subcarrier spacing (SCS), which may refer to values in the protocol in the related art, and values of $N_{gap}$ include but are not limited to {0, 2, 4, 8}.

C: in case that the communication mode is time division duplex (TDD) mode and the terminal receives TDD UL-DL configuration, if an PRACH occasion is on an uplink (UL) symbol, and in the PRACH slot, if there is no synchronization signal block (SSB) behind the PRACH occasion and there are at least $N_{gap}$ symbols between the PRACH occasion and a last symbol of a preceding nearest SSB, and there are at least $N_{gap}$ symbols between the PRACH occasion and a last preceding downlink (DL) symbol, then the PRACH occasion is valid; where $N_{gap}$ is a value related to the subcarrier spacing (SCS), which may refer to values in the protocol in the related art, and values of $N_{gap}$ include but are not limited to {0, 2, 4, 8}.

It should be noted that the "preceding" in this embodiment refers to the front in time sequence, and the "behind" refers to the back in time sequence.

The specific implementation process of the time domain resource configuration method is described hereinafter with specific embodiments.

1) For example: by taking the FDD mode as an example, it is supposed that an SCS for PRACH is 240 KHz, that is, =2, and the first configuration value is N=2; then, Step1: by using the first manner in the foregoing step 11, according to the first configuration value, determining that an actually configured number N' of PRACH slots is 2;

Step2: at this point, each target time domain granularity (duration of a slot corresponding to the subcarrier spacing of 60 KHz) including a total of four slots, selecting the last two slots among the four slots as PRACH slots.

After that, the above step 13 is performed to determine validity of PRACH occasions in the PRACH slot.

2) For example: by taking the TDD mode as an example, the terminal does not receive the TDD uplink-downlink configuration, an SCS for PRACH is 240 KHz, and the first configuration value is N=1; then, Step1: by using the second manner in the foregoing step 11, through pre-configuration, determining that when N=1, an actually configured number N' of PRACH slots is N*240/60/2=2;

Step2: at this point, each target time domain granularity (duration of a slot corresponding to the subcarrier spacing of 60 KHz) including a total of four slots, selecting the last two slots among the four slots as PRACH slots, as shown in FIG. 6.

After that, the step 13 is performed to determine validity of PRACH occasions in the PRACH slot.

3) For example: by taking the TDD mode as an example, the terminal receives TDD uplink-downlink configuration, an SCS for PRACH is 240 KHz, and the first configuration value is N=2; then, Step1: by using the third manner in the foregoing step 11, when high layer indicates existing N=1, determining that an actually configured number N' of PRACH slots is one; when high layer indicates N=2, determining that an actually configured number N' of PRACH slots is three;

Step2: at this point, each target time domain granularity including a total of four slots, selecting the last three slots as PRACH slots, as shown in FIG. 7.

After that, the step 13 is performed to determine validity of PRACH occasions in the PRACH slot.

4) For example: by taking the TDD mode as an example, the terminal receives TDD uplink-downlink configuration, an SCS for PRACH is 480 KHz, and the first configuration value is N=1; then, Step1: by using the fourth manner in the foregoing step 11, determining PRACH configuration table which takes the 240 KHz slot as a reference; where an actually configured number N' of PRACH slots in each target time domain granularity is one;

Step2: at this point, each target time domain granularity (duration of a slot corresponding to the subcarrier spacing of 240 KHz) including a total of two slots, selecting the last one slot of the two slots as PRACH slot.

After that, the step 13 is performed to determine validity of PRACH occasions in the PRACH slot.

Specifically, after the configuration information of the PRACH is obtained and the first configuration value in the configuration information indicates the configuration number of PRACH slots in each target time domain granularity in any one of the above manners, the step 12 includes:

Step 121: judging validity of each slot in the target time domain granularity according to preset conditions and filtering out valid slots. The judging validity of each slot in the target time domain granularity according to preset conditions and filtering out valid slots, includes one of the following:

a: in case that the communication mode is time division duplex (TDD) mode and the terminal does not receive TDD uplink-downlink configuration, if a slot includes a synchronization signal block (SSB) and the number of remaining symbols after an end symbol of a last SSB in the slot is less than a first value, then the slot is an invalid slot. The first value is $N_{dur}^{RA}+N_{gap}$, where $N_{dur}^{RA}$ represents the number of time domain symbols in each PRACH occasion in the configuration information of PRACH, $N_{gap}$ is a value related to the subcarrier spacing (SCS), and values of $N_{gap}$ include but are not limited to {0, 2, 4, 8}.

In case that the current communication mode is the TDD mode and the terminal does not receive TDD UL-DL-ConfigurationCommon, if an PRACH slot includes an SSB, and the number of remaining symbols after an end symbol of a last SSB in the PRACH slot is less than $N_{dur}^{RA}+N_{gap}$, then the PRACH slot is an invalid PRACH slot and needs to be excluded.

b: in case that the communication mode is time division duplex (TDD) mode and the terminal receives TDD uplink-downlink configuration, if the number of consecutive uplink symbols in a slot is less than a first value, then the slot is an invalid slot. The first value is $N_{dur}^{RA}+N_{gap}$, where $N_{dur}^{RA}$ represents the number of time domain symbols in each PRACH occasion in the configuration information of PRACH, $N_{gap}$ is a value related to the subcarrier spacing (SCS), and values of $N_{gap}$ include but are not limited to {0, 2, 4, 8}.

In case that the current communication mode is the TDD mode and the terminal receives TDD UL-DL-ConfigurationCommon, if the number of consecutive UL symbols in an PRACH slot is less than $N_{dur}^{RA}+N_{gap}$, then the PRACH slot is determined to be an invalid PRACH slot and needs to be excluded.

$N_{gap}$ may be determined by referring to a corresponding table of PRACH configuration format index in the protocol in the related art, for example, $N_{gap}$=0, 2, which is related to specific SCS. With introduction of new SCS, the corresponding values of $N_{gap}$ also need to be increased, for example, when SCS=240 KHz, 480 KHz, $N_{gap}$=4.

In this embodiment, the number of valid PRACH slots in the target time domain granularity can be determined as M, where M=0, 1, 2 . . . ; and thus, before judging the validity of the PRACH occasions, invalid slots can be excluded, thereby improving the probability that PRACH occasions are valid.

Step 122: determining the distribution of the PRACH slots in the target time domain granularity, according to the configured number of the PRACH slots in each target time domain granularity and the number of the valid slots.

(1) In case that the number M of valid slots is greater than or equal to the configured number N' of the PRACH slots in each target time domain granularity, if actual available PRACH slots are greater than or equal to the configured number of PRACH slots (M>=N), the distribution of the PRACH slots is determined by one of the following manners:

from the M valid slots, selecting the first N' slots in time sequence as the PRACH slots; where selecting the first N' slots can reduce transmission delay of the PRACH slots to a certain extent;

from the M valid slots, selecting the last N' slots in time sequence as the PRACH slots; where selecting the last N' slots can improve possibilities that PRACH occasions and PRACH slots are valid;

from the M valid slots, selecting, in a comb-like manner, N' slots as the PRACH slots; where selecting N' slots in a comb-like manner can reduce loads of a base station for processing PRACH, and can improve flexibility of other services in occupying remaining resources.

(2) In case that the number M of valid slots is less than the configured number N' of the PRACH slots in each target time domain granularity, the M valid slots are taken as the PRACH slots. That is, if actual available PRACH slots are less than the configured number of PRACH slots (M<N), only the M slots can be taken as PRACH slots.

Optionally, after judging validity of each slot in the target time domain granularity according to preset conditions, the method further includes: sending a judgment result of the validity of each slot to a network device.

According to different communication modes (TDD/FDD) and whether the terminal receives the TDD uplink-downlink configuration parameters, whether each PRACH slot in the target time domain granularity is invalid, μ is determined one by one; and the terminal judges by itself which of the above (1) and (2) conditions, notifies the base station of the judgment result through remaining minimum system information (RMSI). Optionally, both the terminal and the base station judge and exclude invalid slots according to the above preset conditions; that is, the network device also judges validity of each slot in the target time domain granularity according to the above preset conditions and filters out valid slots.

Optionally, after obtaining the locations of the corresponding PRACH slots, whether PRACH occasions configured in the PRACH slots are valid or not needs to be judged based on a specific frame structure; that is, resources configured in actual process need to be selected according to changes of actual frame structures, and corresponding judgment conditions are as follows:

A: in case that the communication mode is frequency division duplex (FDD) mode, PRACH occasions are valid; that is, all PRACH occasions in this mode are valid.

B: in case that the communication mode is time division duplex (TDD) mode and the terminal does not receive TDD UL-DL configuration, in the PRACH slot, if there is no synchronization signal block (SSB) behind an PRACH occasion and there are at least $N_{gap}$ symbols between the PRACH occasion and a last symbol of a preceding nearest SSB, then the PRACH occasion is valid; where $N_{gap}$ is a value related to the subcarrier spacing (SCS), which may refer to values in the protocol in the related art.

C: in case that the communication mode is time division duplex (TDD) mode and the terminal receives TDD UL-DL configuration, if an PRACH occasion is on an uplink (UL) symbol, and in the PRACH slot, if there is no synchronization signal block (SSB) behind the PRACH occasion and there are at least $N_{gap}$ symbols between the PRACH occasion and a last symbol of a preceding nearest SSB, and there are at least $N_{gap}$ symbols between the PRACH occasion and a last preceding downlink (DL) symbol, then the PRACH occasion is valid; where $N_{gap}$ is a value related to the subcarrier spacing (SCS), which may refer to values in the protocol in the related art, and values of $N_{gap}$ include but are not limited to {0, 2, 4, 8}. It should be noted that the "preceding" in this embodiment refers to the front in time sequence, and the "behind" refers to the back in time sequence.

The specific implementation process of the time domain resource configuration method is described hereinafter with specific embodiments.

1) For example: by taking the FDD mode as an example, it is supposed that an SCS for PRACH is 240 KHz, that is, =2, and the first configuration value is N=2; then, Step1: by using the first manner in the foregoing step 11, according to the first configuration value, determining that a configure number N' of PRACH slots is 2;

Step2: at this point, each target time domain granularity (duration of a slot corresponding to the subcarrier spacing of 60 KHz) including a total of four slots, determining that all slots are valid slots and do not need to be excluded, since the communication mode is FDD; thereby obtaining that there are a total of M=4 available slots;

Step3: selecting the first two or the last two slots from the four slots as the PRACH slots.

After that, the above step 13 is performed to determine validity of PRACH occasions in the PRACH slot.

2) For example: by taking the TDD mode as an example, the terminal does not receive the TDD uplink-downlink configuration, an SCS for PRACH is 240 KHz, and the first configuration value is N=1; then, Step1: by using the second manner in the foregoing step 11, through pre-configuration, determining that when N=1, an actually configured number N' of PRACH slots is N'=N*240/60/2=2;

Step2: at this point, each target time domain granularity including a total of four slots, assuming that the first slot does not meet the conditions and is judged as an invalid slot, determining that the remaining M=3 slots are valid slots, as shown in FIG. 8;

Step3: selecting the last two slots from the three valid slots as the PRACH slots.

After that, the above step 13 is performed to determine validity of PRACH occasions in the PRACH slot.

Figure 9:
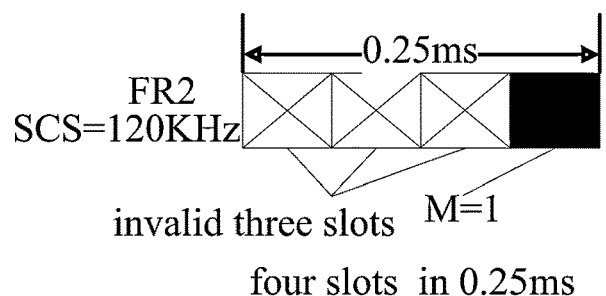
FIG. 9 is a sixth schematic diagram showing distribution of PRACH slots in a target time domain granularity.
Figure 10A:
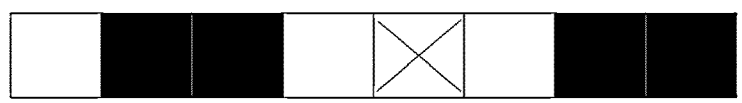
FIG. 10a to FIG. 10e are schematic diagrams showing distribution of PRACH slots in a target time domain granularity.
Figure 10B:
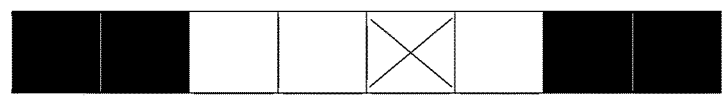
Figure 10C:
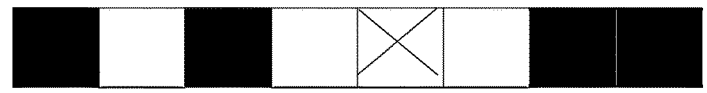
Figure 10D:
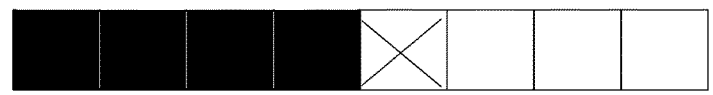
Figure 10E:

3) For example: by taking the TDD mode as an example, the terminal receives TDD uplink-downlink configuration, an SCS for PRACH is 240 KHz, and the first configuration value is N=2; then, Step1: by using the third manner in the foregoing step 11, when high layer indicates existing N=1, determining that an actually configured number N' of PRACH slots is one; when high layer indicates N=2, determining that an actually configured number N' of PRACH slots is three;

Step2: at this point, each target time domain granularity including a total of four slots, assuming that the first three slots do not meet the conditions and are judged as invalid slots, determining that the remaining M=1 slot is a valid slot, as shown in FIG. 9;

Step3: selecting the only one valid slot as the PRACH slot, since there is only one valid slot at this point.

After that, the above step 13 is performed to determine validity of PRACH occasions in the PRACH slot.

4) For example: by taking the TDD mode as an example, the terminal receives TDD uplink-downlink configuration, an SCS for PRACH is 480 KHz, and the first configuration value is N=2; then, Step1: by using the fourth manner in the foregoing step 11, determining PRACH configuration table which takes the 240 KHz slot as a reference; where an actually configured number N' of PRACH slots is two;

Step2: if determining that the number of valid slots is 0, directly determining that all PRACH occasions are invalid.

5) For example: when SCS=480 KHz, if the configuration number of PRACH slots in each target time domain granularity is 4, while an actual number of valid slots is 7, then, four valid slots can be selected according to various schemes as shown in FIG. 10a to FIG. 10e, depending on which selection manner is adopted. In this example, a time domain duration of a 60 KHz slot is taken as the time domain granularity.

Specifically, after obtaining the configuration information of PRACH, the step 12 includes:

segmenting the target time domain granularity according to the configuration information.

Specifically, the target time domain granularity can be equally divided into L segments by the formula:

$$L = \frac{2^{\mu-1} \times 15}{60};$$

where L represents the number of segments for segmenting the target time domain granularity, and μ is a high-level parameter which is used to indicate the subcarrier interval (SCS), μ≥4.

According to the configuration number of PRACH slots, distribution of PRACH slots in each segment of the target time domain granularity is determined; where N' consecutive slots are selected, in time sequence from back to front, from each segment of the target time domain granularity, as PRACH slots, and N' is the configuration number of the PRACH slots in each target time domain granularity.

In this embodiment, the configuration information of PRACH is determined according to the specific PRACH-ConfigurationIndex; each currently configured target time domain granularity (duration of a slot corresponding to the subcarrier spacing of 60 KHz) is equally segmented into $$\frac{2^{\mu-1} \times 15}{60}$$

segments, according to the actual PRACH SCS. At this point, each segment includes two available PRACH slots. Then, according to the specific number information N' of PRACH slots in each target time domain granularity, selection of PRACH slots is performed in each segment of corresponding each target time domain granularity, in accordance with a selection rule which includes: selecting N' consecutive slots in time sequence from back to front as PRACH slots.

Figure 11:
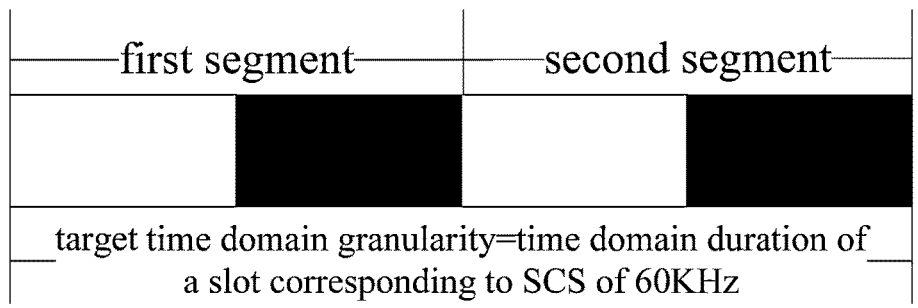
FIG. 11 is a seventh schematic diagram showing distribution of PRACH slots in a target time domain granularity.

For example, the configuration number of PRACH slots in each target time domain granularity indicated by the first configuration value in the configuration information is N'=1, at this point, PRACH SCS=240 KHz, and each time domain granularity is divided into $$\frac{2^{4-1} \times 15}{60} = 2$$

segments. At this point, it is necessary to select N'=1 PRACH slot in each segment. According to the selection rule, the second slot in each segment should be selected as the PRACH slot, as shown in FIG. 11.

After obtaining the locations of the corresponding PRACH slots, whether PRACH occasions configured in the PRACH slots are valid or not needs to be judged based on a specific frame structure; that is, resources configured in actual process need to be selected according to changes of actual frame structures, and corresponding judgment conditions are as follows:

A: in case that the communication mode is frequency division duplex (FDD) mode, PRACH occasions are valid; that is, all PRACH occasions in this mode are valid.

B: in case that the communication mode is time division duplex (TDD) mode and the terminal does not receive TDD UL-DL configuration, in the PRACH slot, if there is no synchronization signal block (SSB) behind an PRACH occasion and there are at least $N_{gap}$ symbols between the PRACH occasion and a last symbol of a preceding nearest SSB, then the PRACH occasion is valid; where $N_{gap}$ is a value related to the subcarrier spacing (SCS), which may refer to values in the protocol in the related art.

C: in case that the communication mode is time division duplex (TDD) mode and the terminal receives TDD UL-DL configuration, if an PRACH occasion is on an uplink (UL)

symbol, and in the PRACH slot, if there is no synchronization signal block (SSB) behind the PRACH occasion and there are at least $N_{gap}$ symbols between the PRACH occasion and a last symbol of a preceding nearest SSB, and there are at least $N_{gap}$ symbols between the PRACH occasion and a last preceding downlink (DL) symbol, then the PRACH occasion is valid; where $N_{gap}$ is a value related to the subcarrier spacing (SCS), which may refer to values in the protocol in the related art, and values of $N_{gap}$ include but are not limited to {0, 2, 4, 8}. It should be noted that the "preceding" in this embodiment refers to the front in time sequence, and the "behind" refers to the back in time sequence.

In the embodiments of the present disclosure, for the situation that larger subcarrier spacing and other parameters may be introduced for the frequency bands above NR 52.6 GHz, by using the first configuration value in the configuration information to indicate the configuration number of PRACH slots in each target time domain granularity, determining distribution of the PRACH slots in the target time domain granularity according to the configuration information and determining validity of PRACH occasions in the PRACH slot, it can provide a more reliable PRACH resource selection mechanism for PRACH for which a larger SCS may be introduced in the future.

Figure 12:
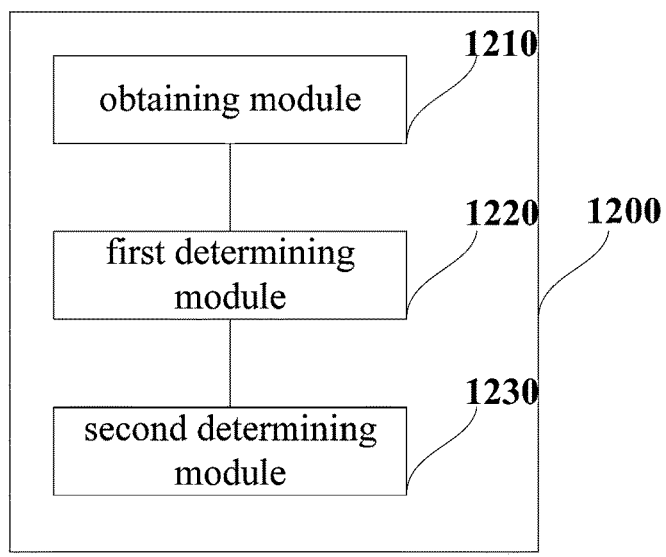
FIG. 12 is a schematic diagram showing modules of a terminal according to an embodiment of the present disclosure.

As shown in FIG. 12, one embodiment of the present disclosure further provides a terminal 1200, including:
- an obtaining module 1210 configured to obtain configuration information of a physical random access channel (PRACH); where the configuration information includes a first configuration value, and the first configuration value is used to indicate a configuration number of PRACH slots in each target time domain granularity;
- a first determining module 1220 configured to determine distribution of the PRACH slots in the target time domain granularity according to the configuration information; and
- a second determining module 1230 configured to determine validity of PRACH occasions in the PRACH slots.

Optionally, in case that the target time domain granularity is a first time domain granularity, the first configuration value is a configuration number of PRACH slots in each first time domain granularity; that is, $N'=N=3, \ldots 2^{\mu} \times 15/60$;

Where N' represents the configuration number of the PRACH slots in each first time domain granularity, N represents the first configuration value, and $\mu$ is a high-level parameter which is used to indicate a subcarrier spacing (SCS), $\mu \geq 4$.

Optionally, in case that the target time domain granularity is the first time domain granularity, the first configuration value indicates a configuration number of PRACH slots in each first time domain granularity with a formula:

$$N' = N \times \frac{2^{\mu} \times 15}{60}/2;$$

Where N' represents the configuration number of PRACH slots in each first time domain granularity, N represents the first configuration value, $\mu$ is a high-level parameter which is used to indicate a subcarrier spacing (SCS), $\mu \geq 4$.

Optionally, in case that the target time domain granularity is the first time domain granularity, the configuration number of PRACH slots in each first time domain granularity, which is corresponding to the first configuration value, is configured by Radio Resource Control (RRC) or indicated by pre-configuration.

A value range of the configuration number N' of PRACH slots in each first time domain granularity is: [1 to $2^{\mu} \times 15/60$], $\mu$ is a high-level parameter which is used to indicate a subcarrier spacing (SCS), $\mu \geq 4$.

Optionally, the first time domain granularity is a time domain duration of a slot corresponding to a subcarrier spacing (SCS) of 60 KHz.

Optionally, the first configuration value indicates a configuration number of PRACH slots in each second time domain granularity, and the second time domain granularity is a time domain duration of a slot corresponding to a subcarrier spacing (SCS) of 240 KHz.

Optionally, elements in a second time domain granularity index set in one frame period are: an element in a first time domain granularity index set+40*i; where i=0, 1, 2, 3, and the first time domain granularity is a time domain duration of a slot corresponding to a subcarrier spacing (SCS) of 60 KHz.

Optionally, the first determining module 1220 includes:
- a first selection unit configured to, in the target time domain granularity, select N' consecutive slots from back to front in time sequence as the PRACH slots; where N' is the configuration number of PRACH slots in each target time domain granularity.

Optionally, the first determining module 1220 includes:
- a judging unit configured to judge validity of each slot in the target time domain granularity according to preset conditions and filter out valid slots; and
- a first determining unit configured to determine the distribution of the PRACH slots in the target time domain granularity, according to the configured number of the PRACH slots in each target time domain granularity and the number of the valid slots.

Optionally, the terminal further includes:
- a sending module configured to send a judgment result of the validity of each slot to a network device.

Optionally, the judging unit is specifically configured to, in case that the communication mode is time division duplex (TDD) mode and the terminal does not receive TDD uplink-downlink configuration, if a slot includes a synchronization signal block (SSB) and the number of remaining symbols after an end symbol of a last SSB in the slot is less than a first value, judge that the slot is an invalid slot;

in case that the communication mode is time division duplex (TDD) mode and the terminal receives TDD uplink-downlink configuration, if the number of consecutive uplink symbols in a slot is less than the first value, judge that the slot is an invalid slot;

where the first value is $N_{dur}^{RA}+N_{gap}$, where $N_{dur}^{RA}$ represents the number of time domain symbols in each PRACH occasion in the configuration information of PRACH, $N_{gap}$ is a value related to the subcarrier spacing (SCS).

Optionally, the first determining unit is specifically configured to, in case that the number M of valid slots is greater than or equal to the configured number N' of the PRACH slots in each target time domain granularity, determine the distribution of the PRACH slots according to one of the following manners:

from the M valid slots, selecting the first N' slots in time sequence as the PRACH slots;

from the M valid slots, selecting the last N' slots in time sequence as the PRACH slots;

from the M valid slots, selecting, in a comb-like manner, N' slots as the PRACH slots.

Optionally, the first determining unit is specifically configured to, in case that the number M of valid slots is less than the configured number N' of the PRACH slots in each target time domain granularity, take the M valid slots as the PRACH slots.

Optionally, the first determining module 1220 includes:

a processing unit configured to segment the target time domain granularity according to the configuration information;

a second determining unit configured to determine distribution of PRACH slots in each segment of the target time domain granularity, according to the configuration number of PRACH slots;

where N' consecutive slots are selected, in time sequence from back to front, from each segment of the target time domain granularity, as PRACH slots, and N' is the configuration number of the PRACH slots in each target time domain granularity.

Optionally, the processing unit is specifically configured to equally divide the target time domain granularity into L segments by the formula:

$$L = \frac{2^{\mu-1} \times 15}{60};$$

where L represents the number of segments for segmenting the target time domain granularity, and μ is a high-level parameter which is used to indicate the subcarrier interval (SCS), μ≥4.

Optionally, the second determining module 1230 is specifically configured to, in case that the communication mode is frequency division duplex (FDD) mode, determine that PRACH occasions are valid;

in case that the communication mode is time division duplex (TDD) mode and the terminal does not receive TDD UL-DL configuration, in the PRACH slot, if there is no synchronization signal block (SSB) behind an PRACH occasion and there are at least $N_{gap}$ symbols between the PRACH occasion and a last symbol of a preceding nearest SSB, determine that the PRACH occasion is valid;

in case that the communication mode is time division duplex (TDD) mode and the terminal receives TDD UL-DL configuration, if an PRACH occasion is on an uplink (UL) symbol, and in the PRACH slot, if there is no synchronization signal block (SSB) behind the PRACH occasion and there are at least $N_{gap}$ symbols between the PRACH occasion and a last symbol of a preceding nearest SSB, and there are at least $N_{gap}$ symbols between the PRACH occasion and a last preceding downlink (DL) symbol, determine that the PRACH occasion is valid;

where $N_{gap}$ is a value related to the subcarrier spacing (SCS).

It should be noted that this terminal embodiment refers to a terminal corresponding to the above time domain resource configuration method, and all implementation manners of the above embodiment are applicable to this terminal embodiment, and the same technical effect can be achieved. In this embodiment, for the situation that larger subcarrier spacing and other parameters may be introduced for the frequency bands above NR 52.6 GHz, by using the first configuration value in the configuration information to indicate the configuration number of PRACH slots in each target time domain granularity, determining distribution of the PRACH slots in the target time domain granularity according to the configuration information and determining validity of PRACH occasions in the PRACH slot, it can provide a more reliable PRACH resource selection mechanism for PRACH for which a larger SCS may be introduced in the future.

Figure 13:
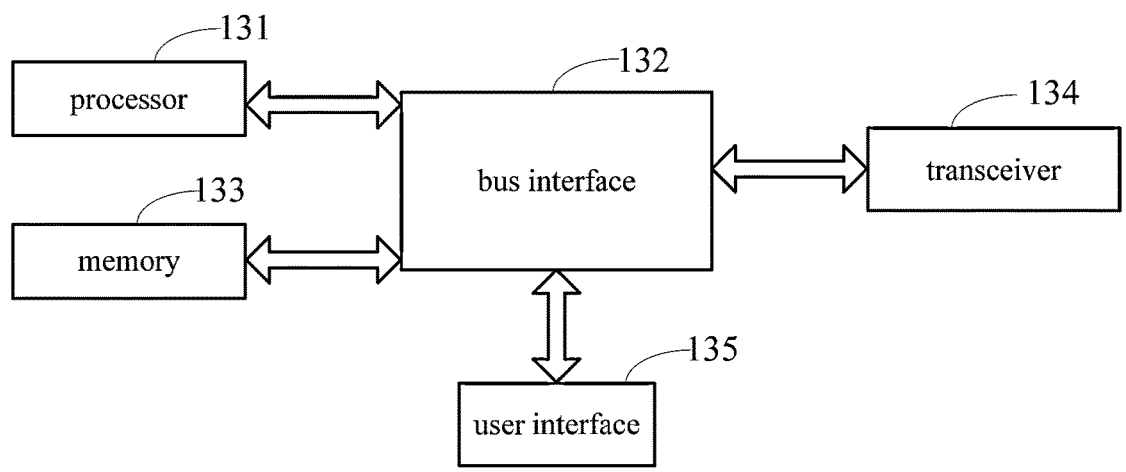
FIG. 13 is a schematic diagram showing an implementation structure of a terminal according to an embodiment of the present disclosure.

In order to better achieve the foregoing objectives, as shown in FIG. 13, one embodiment of the present disclosure further provides a terminal, including a transceiver 134, a memory 133, a processor 131, and a computer program stored in the memory and executable on the processor.

The memory 133 is coupled to the processor 131 through a bus interface 132. The memory 133 is used to store programs and data used by the processor 131 for performing operations. When the processor 131 calls and executes the programs and data stored in the memory 133, the steps of the above time domain resource configuration method are executed.

The transceiver 134 is coupled to the bus interface 132 and is used to receive and send data under control of the processor 131. Specifically, the processor 131 executes the computer program to implement the following steps:

obtaining configuration information of a physical random access channel (PRACH); where the configuration information includes a first configuration value, and the first configuration value is used to indicate a configuration number of PRACH slots in each target time domain granularity;

determining distribution of the PRACH slots in the target time domain granularity according to the configuration information; and determining validity of PRACH occasions in the PRACH slots.

Optionally, in case that the target time domain granularity is a first time domain granularity, the first configuration value is a configuration number of PRACH slots in each first time domain granularity; that is, $$N'=N=3, \ldots 2^{\mu} \times 15/60;$$

Where N' represents the configuration number of the PRACH slots in each first time domain granularity, N represents the first configuration value, and μ is a high-level parameter which is used to indicate a subcarrier spacing (SCS), μ≥4.

Optionally, in case that the target time domain granularity is the first time domain granularity, the first configuration value indicates a configuration number of PRACH slots in each first time domain granularity with a formula:

$$N' = N \times \frac{2^{\mu} \times 15}{60}/2;$$

Where N' represents the configuration number of PRACH slots in each first time domain granularity, N represents the first configuration value, μ is a high-level parameter which is used to indicate a subcarrier spacing (SCS), μ≥4.

Optionally, in case that the target time domain granularity is the first time domain granularity, the configuration number of PRACH slots in each first time domain granularity, which is corresponding to the first configuration value, is configured by Radio Resource Control (RRC) or indicated by pre-configuration.

A value range of the configuration number N' of PRACH slots in each first time domain granularity is: [1 to $2^\mu \times 15/60$], μ is a high-level parameter which is used to indicate a subcarrier spacing (SCS), $\mu \geq 4$.

Optionally, the first time domain granularity is a time domain duration of a slot corresponding to a subcarrier spacing (SCS) of 60 KHz.

Optionally, the first configuration value indicates a configuration number of PRACH slots in each second time domain granularity, and the second time domain granularity is a time domain duration of a slot corresponding to a subcarrier spacing (SCS) of 240 KHz.

Optionally, elements in a second time domain granularity index set in one frame period are: an element in a first time domain granularity index set+40*i; where i=0, 1, 2, 3, and the first time domain granularity is a time domain duration of a slot corresponding to a subcarrier spacing (SCS) of 60 KHz.

Optionally, the processor executes the computer program to implement the following steps:
in the target time domain granularity, selecting N' consecutive slots from back to front in time sequence as the PRACH slots; where N' is the configuration number of PRACH slots in each target time domain granularity.

Optionally, the processor executes the computer program to implement the following steps:
judging validity of each slot in the target time domain granularity according to preset conditions and filtering out valid slots; and
determining the distribution of the PRACH slots in the target time domain granularity, according to the configuration number of the PRACH slots in each target time domain granularity and the number of the valid slots.

Optionally, the processor executes the computer program to implement the following steps:
sending a judgment result of the validity of each slot to a network device.

Optionally, the processor executes the computer program to implement one of the following steps:
in case that the communication mode is time division duplex (TDD) mode and the terminal does not receive TDD uplink-downlink configuration, if a slot includes a synchronization signal block (SSB) and the number of remaining symbols after an end symbol of a last SSB in the slot is less than a first value, judging that the slot is an invalid slot;
in case that the communication mode is time division duplex (TDD) mode and the terminal receives TDD uplink-downlink configuration, if the number of consecutive uplink symbols in a slot is less than the first value, judging that the slot is an invalid slot;
where the first value is $N_{dur}^{RA}+N_{gap}$, where $N_{dur}^{RA}$ represents the number of time domain symbols in each PRACH occasion in the configuration information of PRACH, $N_{gap}$ is a value related to the subcarrier spacing (SCS).

Optionally, the processor executes the computer program to implement the following steps:
in case that the number M of valid slots is greater than or equal to the configuration number N' of the PRACH slots in each target time domain granularity, determining the distribution of the PRACH slots according to one of the following manners:
from the M valid slots, selecting the first N' slots in time sequence as the PRACH slots;
from the M valid slots, selecting the last N' slots in time sequence as the PRACH slots;
from the M valid slots, selecting, in a comb-like manner, N' slots as the PRACH slots.

Optionally, the processor executes the computer program to implement the following steps:
in case that the number M of valid slots is less than the configuration number N' of the PRACH slots in each target time domain granularity, taking the M valid slots as the PRACH slots.

Optionally, the processor executes the computer program to implement the following steps:
segmenting the target time domain granularity according to the configuration information;
determining distribution of PRACH slots in each segment of the target time domain granularity, according to the configuration number of PRACH slots;
where N' consecutive slots are selected, in time sequence from back to front, from each segment of the target time domain granularity, as PRACH slots, and N' is the configuration number of the PRACH slots in each target time domain granularity.

Optionally, the processor executes the computer program to implement the following steps:
equally dividing the target time domain granularity into L segments by the formula:

$$L = \frac{2^{\mu-1} \times 15}{60};$$

where L represents the number of segments for segmenting the target time domain granularity, and μ is a high-level parameter which is used to indicate the subcarrier interval (SCS), $\mu \geq 4$.

Optionally, the processor executes the computer program to implement the following steps:
in case that the communication mode is frequency division duplex (FDD) mode, determining that PRACH occasions are valid;
in case that the communication mode is time division duplex (TDD) mode and the terminal does not receive TDD UL-DL configuration, in the PRACH slot, if there is no synchronization signal block (SSB) behind an PRACH occasion and there are at least $N_{gap}$ symbols between the PRACH occasion and a last symbol of a preceding nearest SSB, determining that the PRACH occasion is valid;
in case that the communication mode is time division duplex (TDD) mode and the terminal receives TDD UL-DL configuration, if an PRACH occasion is on an uplink (UL) symbol, and in the PRACH slot, if there is no synchronization signal block (SSB) behind the PRACH occasion and there are at least $N_{gap}$ symbols between the PRACH occasion and a last symbol of a preceding nearest SSB, and there are at least $N_{gap}$ symbols between the PRACH occasion and a last preceding downlink (DL) symbol, determining that the PRACH occasion is valid;
where $N_{gap}$ is a value related to the subcarrier spacing (SCS).

It should be noted that in FIG. 13, a bus architecture may include any number of interconnected bus and bridge. Specifically, various circuits of one or more processors, which are represented by the processor 131, and one or more memories, which are represented by the memory 133, are linked together. The bus architecture may link various other circuits, such as a peripheral device, voltage regulator and a power management circuit together. These features are well known in this field; therefore, this disclosure does not make further description on these features. The bus interface provides an interface. The transceiver 134 may be multiple elements, including a transmitter and a receiver and provide units, which communicate with other devices on the transmission medium. For different terminals, a user interface 135 may also be an interface capable of externally connecting required devices, and the connected devices include but are not limited to keypads, displays, speakers, microphones, joysticks, etc. The processor 13 is responsible for managing the bus architecture and the normal processing. The memory 133 may be used to store data used by the processor 131 for performing operations.

Those skilled in the art can understand that all or part of the steps of the above embodiments may be completed by hardware, or may be completed by instructing relevant hardware through a computer program, where the computer program includes instructions for executing part or all of the steps of the above method. The computer program may be stored in a readable storage medium, and the storage medium may be any form of storage medium.

In addition, one embodiment of the present disclosure further provides a computer-readable storage medium, including a computer program stored thereon. The program is executed by a processor to implement the steps in the above time domain resource configuration method, with the same technical effect being achieved. In order to avoid repetition, details are not repeated here. The computer-readable storage medium may be, for example, a read-only memory (ROM), a random access memory (RAM), a magnetic disk, or an optical disk.

In addition, it should be noted that in the devices and methods of the present disclosure, apparently, each component or each step may be decomposed and/or recombined. These decomposition and/or recombination should be regarded as equivalent solutions of the present disclosure. In addition, the steps of performing the above series of processing may be performed naturally in chronological order in the order of description, but do not necessarily need to be performed in chronological order, and some steps may be performed in parallel or independently of each other. Those of ordinary skill in the art can understand that all or any of the steps or components of the method and device of the present disclosure may be implemented in hardware, firmware, software or a combination thereof in any computing device (including processor, storage medium, etc.) or network of computing devices, which can be achieved by those of ordinary skill in the art with their basic programming skills after reading the description of the present disclosure.

Therefore, the object of the present disclosure may also be achieved by running a program or a set of programs on any computing device. The computing device may be a well-known universal device. Therefore, the object of the present disclosure may also be achieved only by providing a program product containing program codes for implementing the method or device. In other words, such a program product also constitutes the present disclosure, and a storage medium storing such a program product also constitutes the present disclosure. Apparently, the storage medium may be any known storage medium or any storage medium developed in the future. It should also be noted that in the devices and methods of the present disclosure, apparently, each component or each step may be decomposed and/or recombined. These decomposition and/or recombination should be regarded as equivalent solutions of the present disclosure. In addition, the steps of performing the above series of processing may be performed naturally in chronological order in the order of description, but do not necessarily need to be performed in chronological order, and some steps may be performed in parallel or independently of each other.

Persons having ordinary skill in the art may obtain that, taking into account various embodiments of the present disclosure, units and algorithm blocks described in each example may be implemented by electronic hardware, or in a combination of computer software and electronic hardware. Whether these functions are implemented by using hardware or software depends on specific application, and design constraints of the technical solution. A skilled person may adopt different methods to implement described functions of each specific application, but such implementation should not be considered to extend beyond the scope of the present disclosure.

Persons having ordinary skill in the art may clearly understand that, for convenient and concise of the description, specific work process of foregoing system, device and unit may refer to a corresponding process in method embodiments, which are not repeated here.

When the functions are implemented in the form of a software functional unit, and sold or used as an independent product, such software functional unit may be stored in a computer readable storage medium. On the basis of such understanding, essence of technical solution in the present disclosure, or a part thereof contributing to the existing technology, or just a part of the technical solution may be demonstrated with a software product. The computer software product is stored in a storage medium, which includes several instructions to enable a computer device (which may be a Personal Computer (PC), a server, or a network device, and so on) to execute all the blocks, or some blocks in a method of each embodiment in the present disclosure. The foregoing storage medium includes a U disk, a mobile hard disk, a Read-Only Memory (ROM), a Random Access Memory (RAM), a disk, or a Compact Disk (CD), or various mediums which may store program codes.

Persons having ordinary skill in the art can understand that all or part of the processes in the foregoing method embodiments can be implemented by controlling relevant hardware through a computer program. The program may be stored in a computer readable storage medium. The program is executed to perform procedures of the foregoing method embodiments. The storage medium may be a magnetic disk, an optical disc, a read-only memory (ROM), or a random access memory (RAM), etc.

It can be understood that these embodiments described in the present disclosure may be implemented with hardware, software, firmware, middleware, microcode, or a combination thereof. As for hardware implementation, the processing unit can be implemented in one or multiple Application-Specific Integrated Circuits (ASIC), Digital Signal Processors (DSP), Digital Signal Processing Devices (DSPD), Programmable Logic Devices (PLD), Field-Programmable Gate Arrays (FPGA), general-purpose processors, controllers, micro-controllers, micro-processors, and other electronic units or combinations thereof used to perform the functions described in the present disclosure.

For software implementations, the technologies described in the present disclosure can be implemented through the modules that perform the functions described in the present disclosure (such as procedures, functions, and so on). Software codes can be stored in the storage and executed by the processor. The storage can be implemented in or outside of the processor.

The above are optional embodiments of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. A time domain resource configuration method, comprising:
obtaining configuration information of a physical random access channel (PRACH); wherein the configuration information includes a first configuration value, and the first configuration value is used to indicate a configuration number of PRACH slots in each target time domain granularity;
determining distribution of the PRACH slots in a target time domain granularity according to the configuration information; and
determining validity of PRACH occasions in the PRACH slots;
wherein the determining distribution of the PRACH slots in the target time domain granularity according to the configuration information, includes:
segmenting the target time domain granularity according to the configuration information;
determining distribution of PRACH slots in each segment of the target time domain granularity, according to the configuration number of PRACH slots;
wherein N' consecutive slots are selected, in time sequence from back to front, from each segment of the target time domain granularity, as PRACH slots, and N' is the configuration number of the PRACH slots in each segment of each target time domain granularity.

2. The method according to claim 1, wherein the first configuration value indicates a configuration number of PRACH slots in each second time domain granularity, and the second time domain granularity is a time domain duration of a slot corresponding to a subcarrier spacing (SCS) of 240 KHz;
wherein elements in a second time domain granularity index set in one frame period are: an element in a first time domain granularity index set+40*i;
wherein i=0, 1, 2, 3, and the first time domain granularity is a time domain duration of a slot corresponding to a subcarrier spacing (SCS) of 60 KHz.

3. The method according to claim 1, wherein the determining distribution of the PRACH slots in the target time domain granularity according to the configuration information, includes:
in the target time domain granularity, selecting N' consecutive slots from back to front in time sequence as the PRACH slots; wherein N' is the configuration number of PRACH slots in each target time domain granularity.

4. The method according to claim 1, wherein the determining distribution of the PRACH slots in the target time domain granularity according to the configuration information, includes:
judging validity of each slot in the target time domain granularity according to preset conditions and filtering out valid slots; and
determining the distribution of the PRACH slots in the target time domain granularity according to the configuration number of the PRACH slots in each target time domain granularity and the number of the valid slots.

5. The method according to claim 4, wherein after judging validity of each slot in the target time domain granularity according to preset conditions, the method further includes:
sending a judgment result of the validity of each slot to a network device;
wherein the judging validity of each slot in the target time domain granularity according to preset conditions and filtering out valid slots, includes one of the following:
in case that a communication mode is time division duplex (TDD) mode and the terminal does not receive TDD uplink-downlink configuration, if a slot includes a synchronization signal block (SSB) and the number of remaining symbols after an end symbol of a last SSB in the slot is less than a first value, judging that the slot is an invalid slot;
in case that a communication mode is time division duplex (TDD) mode and the terminal receives TDD uplink-downlink configuration, if the number of consecutive uplink symbols in a slot is less than a first value, judging that the slot is an invalid slot;
wherein the first value is $N_{dur}^{RA}+N_{gap}$, $N_{dur}^{RA}$ represents the number of time domain symbols in each PRACH occasion in the configuration information of PRACH, and $N_{gap}$ is a value related to the subcarrier spacing (SCS).

6. The method according to claim 1, wherein the segmenting the target time domain granularity according to the configuration information, includes:
dividing the target time domain granularity into L segments by the formula $$L = \frac{2^{\mu-1} \times 15}{60};$$

wherein L represents the number of segments for segmenting the target time domain granularity, and μ is a high-level parameter which is used to indicate the subcarrier interval (SCS), μ≥4.

7. The method according to claim 1, wherein the determining validity of PRACH occasions in the PRACH slots, includes:
in case that a communication mode is frequency division duplex (FDD) mode, determining that PRACH occasions are valid;
in case that the communication mode is time division duplex (TDD) mode and the terminal does not receive TDD UL-DL configuration, in the PRACH slot, if there is no synchronization signal block (SSB) behind an PRACH occasion and there are at least $N_{gap}$ symbols between the PRACH occasion and a last symbol of a preceding nearest SSB, determining that the PRACH occasion is valid;
in case that the communication mode is time division duplex (TDD) mode and the terminal receives TDD UL-DL configuration, if an PRACH occasion is on an uplink (UL) symbol, and in the PRACH slot, if there is no synchronization signal block (SSB) behind the PRACH occasion and there are at least $N_{gap}$ symbols between the PRACH occasion and a last symbol of a preceding nearest SSB, and there are at least $N_{gap}$ symbols between the PRACH occasion and a last preceding downlink (DL) symbol, determining that the PRACH occasion is valid;

wherein $N_{gap}$ is a value related to the subcarrier spacing (SCS).

8. The method according to claim 7, wherein a value of the $N_{gap}$ is one of 0, 2, 4 and 8.

9. A terminal comprising: a transceiver, a memory, a processor, and a computer program stored on the memory and executable on the processor; wherein the processor executes the computer program to implement the following steps:

obtaining configuration information of a physical random access channel (PRACH); wherein the configuration information includes a first configuration value, and the first configuration value is used to indicate a configuration number of PRACH slots in each target time domain granularity;

determining distribution of the PRACH slots in a target time domain granularity according to the configuration information; and determining validity of PRACH occasions in the PRACH slots;

wherein the processor executes the computer program to implement the following steps:

segmenting the target time domain granularity according to the configuration information;

determining distribution of PRACH slots in each segment of the target time domain granularity, according to the configuration number of PRACH slots;

wherein N' consecutive slots are selected, in time sequence from back to front, from each segment of the target time domain granularity, as PRACH slots, and N' is the configuration number of the PRACH slots in each segment of each target time domain granularity.

10. The terminal according to claim 9, wherein the terminal further includes one of the following:

(i) in case that the target time domain granularity is a first time domain granularity, the first configuration value is a configuration number of PRACH slots in each first time domain granularity, which is expressed with the following formula:

$N'=N=3, \ldots 2^{\mu} \times 15/60;$ wherein N' represents the configuration number of the PRACH slots in each first time domain granularity, N represents the first configuration value, and μ is a high-level parameter which is used to indicate a subcarrier spacing (SCS), $\mu \geq 4$;

(ii) in case that the target time domain granularity is a first time domain granularity, the first configuration value indicates a configuration number of PRACH slots in each first time domain granularity with a formula:

$$N' = N \times \frac{2^{\mu} \times 15}{60}/2;$$

wherein N' represents the configuration number of the PRACH slots in each first time domain granularity, N represents the first configuration value, μ is a high-level parameter which is used to indicate a subcarrier spacing (SCS), $\mu \geq 4$;

(iii) in case that the target time domain granularity is a first time domain granularity, a configuration number of PRACH slots in each first time domain granularity, which is corresponding to the first configuration value, is configured by radio resource control (RRC) or indicated by pre-configuration;

a value range of the configuration number N' of PRACH slots in each first time domain granularity is: [1 to $2^{\mu} \times 15/60$], μ is a high-level parameter which is used to indicate a subcarrier spacing (SCS), $\mu \geq 4$;

wherein the first time domain granularity is a time domain duration of a slot corresponding to a subcarrier spacing (SCS) of 60 KHz.

11. The terminal according to claim 9, wherein the first configuration value indicates a configuration number of PRACH slots in each second time domain granularity, and the second time domain granularity is a time domain duration of a slot corresponding to a subcarrier spacing (SCS) of 240 KHz;

wherein elements in a second time domain granularity index set in one frame period are: an element in a first time domain granularity index set+40*i;

wherein i=0, 1, 2, 3, and the first time domain granularity is a time domain duration of a slot corresponding to a subcarrier spacing (SCS) of 60 KHz.

12. The terminal according to claim 9, wherein the processor executes the computer program to implement the following steps:

in the target time domain granularity, selecting N' consecutive slots from back to front in time sequence as the PRACH slots; wherein N' is the configuration number of PRACH slots in each target time domain granularity.

13. The terminal according to claim 9, wherein the processor executes the computer program to implement the following steps:

judging validity of each slot in the target time domain granularity according to preset conditions and filtering out valid slots; and determining the distribution of the PRACH slots in the target time domain granularity according to the configuration number of the PRACH slots in each target time domain granularity and the number of the valid slots.

14. The terminal according to claim 13, wherein the processor executes the computer program to implement the following steps: sending a judgment result of the validity of each slot to a network device;

wherein the processor executes the computer program to implement one of the following steps:

in case that a communication mode is time division duplex (TDD) mode and the terminal does not receive TDD uplink-downlink configuration, if a slot includes a synchronization signal block (SSB) and the number of remaining symbols after an end symbol of a last SSB in the slot is less than a first value, judging that the slot is an invalid slot;

in case that a communication mode is time division duplex (TDD) mode and the terminal receives TDD uplink-downlink configuration, if the number of consecutive uplink symbols in a slot is less than a first value, judging that the slot is an invalid slot;

wherein the first value is $N_{dur}^{RA}+N_{gap}$, $N_{dur}^{RA}$ represents the number of time domain symbols in each PRACH occasion in the configuration information of PRACH, and $N_{gap}$ is a value related to the subcarrier spacing (SCS).

15. The terminal according to claim 9, wherein the processor executes the computer program to implement the following steps:
   equally dividing the target time domain granularity into L segments by the formula: L =

$$\frac{2^{\mu-1} \times 15}{60};$$

wherein L represents the number of segments for segmenting the target time domain granularity, and µ is a high-level parameter which is used to indicate the subcarrier interval (SCS), µ≥4.

16. The terminal according to claim 9, wherein the processor executes the computer program to implement the following steps:
   in case that a communication mode is frequency division duplex (FDD) mode, determining that PRACH occasions are valid;
   in case that the communication mode is time division duplex (TDD) mode and the terminal does not receive TDD UL-DL configuration, in the PRACH slot, if there is no synchronization signal block (SSB) behind an PRACH occasion and there are at least $N_{gap}$ symbols between the PRACH occasion and a last symbol of a preceding nearest SSB, determining that the PRACH occasion is valid;
   in case that the communication mode is time division duplex (TDD) mode and the terminal receives TDD UL-DL configuration, if an PRACH occasion is on an uplink (UL) symbol, and in the PRACH slot, if there is no synchronization signal block (SSB) behind the PRACH occasion and there are at least $N_{gap}$ symbols between the PRACH occasion and a last symbol of a preceding nearest SSB, and there are at least $N_{gap}$ symbols between the PRACH occasion and a last preceding downlink (DL) symbol, determining that the PRACH occasion is valid;
   wherein $N_{gap}$ is a value related to the subcarrier spacing (SCS).

17. The terminal according to claim 16, wherein a value of the $N_{gap}$ is one of 0, 2, 4 and 8.

18. A time domain resource configuration method, comprising:
   obtaining configuration information of a physical random access channel (PRACH); wherein the configuration information includes a first configuration value, and the first configuration value is used to indicate a configuration number of PRACH slots in each target time domain granularity;
   determining distribution of the PRACH slots in a target time domain granularity according to the configuration information; and
   determining validity of PRACH occasions in the PRACH slots;
   wherein the method further includes one of the following:
   (i) in case that the target time domain granularity is a first time domain granularity, the first configuration value is a configuration number of PRACH slots in each first time domain granularity, which is expressed with the following formula:

$N'=N=3, \ldots 2^{\mu}\times15/60$;

wherein N' represents the configuration number of the PRACH slots in each first time domain granularity, N represents the first configuration value, and µ is a high-level parameter which is used to indicate a subcarrier spacing (SCS), µ≥4;
   (ii) in case that the target time domain granularity is a first time domain granularity, the first configuration value indicates a configuration number of PRACH slots in each first time domain granularity with a formula:

$$N' = N \times \frac{2^{\mu} \times 15}{60}/2;$$

wherein N' represents the configuration number of the PRACH slots in each first time domain granularity, N represents the first configuration value, µ is a high-level parameter which is used to indicate a subcarrier spacing (SCS), µ≥4;
   (iii) in case that the target time domain granularity is a first time domain granularity, a configuration number of PRACH slots in each first time domain granularity, which is corresponding to the first configuration value, is configured by radio resource control (RRC) or indicated by pre-configuration;
   a value range of the configuration number N' of PRACH slots in each first time domain granularity is: [1 to $2^{\mu}\times15/60$], µ is a high-level parameter which is used to indicate a subcarrier spacing (SCS), µ≥4;
   wherein the first time domain granularity is a time domain duration of a slot corresponding to a subcarrier spacing (SCS) of 60 KHz.

* * * * *